United States Patent [19]
Seki et al.

[11] Patent Number: 5,845,194
[45] Date of Patent: Dec. 1, 1998

[54] SELF-DIAGNOSTIC METHOD OF RADIO PORTABLE DEVICE

[75] Inventors: Hiroyuki Seki; Terumi Hakamada, both of Sendai, Japan

[73] Assignee: Matsushita Electric Industrial Co., Ltd., Osaka, Japan

[21] Appl. No.: 538,796

[22] Filed: Oct. 3, 1995

[30] Foreign Application Priority Data

Oct. 5, 1994 [JP] Japan ..................... 6-241224

[51] Int. Cl.⁶ .................................... H04B 7/00
[52] U.S. Cl. ........................ 455/38.1; 455/67.1
[58] Field of Search .................. 455/38.1, 67.1, 455/67.4, 115, 62, 218, 212, 88, 68, 70, 517, 524; 379/6, 21, 27, 29, 31, 350, 372, 386, 351, 282, 286

[56] References Cited

U.S. PATENT DOCUMENTS 5,392,348  2/1995  Park et al. ..................... 379/386
5,469,494  11/1995  Ortiz Perez et al. ............ 379/22
5,619,564  4/1997  Canniff et al. ................. 379/351

FOREIGN PATENT DOCUMENTS 2-246429  10/1990  Japan .
4-36345    3/1992  Japan .
4-199922   7/1992  Japan .

Primary Examiner—Reinhard J. Eisenzopf
Assistant Examiner—Marsha D. Banks-Harold
Attorney, Agent, or Firm—Ratner & Prestia

[57] ABSTRACT

Disclosed is a constitution for repeated self-diagnosis of a radio portable device having a two-way radio device alone, in a wireless communication system using DTMF control. By the instruction from the operation unit, output signals of a transmission sound circuit and a transmission DTMF circuit are repeatedly received in a reception sound circuit and a reception DTMF circuit, and the output from the speaker is inspected, thereby diagnosing the circuits.

14 Claims, 4 Drawing Sheets

SELF-DIAGNOSTIC METHOD OF RADIO PORTABLE DEVICE

BACKGROUND OF THE INVENTION

1. Field of the Invention

The present invention relates to a self-diagnostic method of a radio portable device having a two-way radio device of wireless communication system using DTMF (dual tone multi-frequency) in communication control.

2. Description of the Prior Art

In a radio portable device of wireless communication system using DTMF in communication control, hitherto, the transmitted sound is repeatedly received in the radio portable device, and hence the sound transmitting and receiving circuits are diagnosed.

That is, the sound signal entered through a microphone is converted into an electric signal in a transmission sound circuit, repeated in a repeating circuit, converted into a sound signal in a reception sound circuit, and produced from a speaker, and the radio portable device is diagnosed by this output sound.

In such conventional diagnostic method, however, when the speech fails, the sound transmitting and receiving circuits can be diagnosed, but the transmitting and receiving circuits of DTMF used for communication control cannot be diagnosed, and hence a defective point cannot be identified. Moreover, since transmission is done simultaneously with diagnosis, it may cause effects on other radio communication of wireless communication, and the system may go down.

Besides, for diagnosing incoming radio wave state, change of setting of DIP switch was necessary, and hence a tool for changing the setting was needed.

SUMMARY OF THE INVENTION

The invention is intended to solve the above problems, and it is hence an object thereof to present a self-diagnostic method of a radio portable device capable of self-diagnosing a radio portable device having a two-way radio device repeatedly by itself.

To achieve the object, the invention provides a self-diagnostic method of radio portable device having a two-way radio device of wireless communication system using DTMF control characterized by manipulating a specific key in an operation unit to set the radio portable device in self-diagnostic state, and repeatedly receiving transmitted DTMF and transmitted sound, thereby diagnosing each DTMF circuit and sound circuit of transmission and reception.

In the self-diagnostic state, moreover, the reception system radio circuit is forced to be in reception state by key manipulation in the operation unit, and the incoming radio wave state is diagnosed by hearing through the speaker.

Therefore, according to the invention, by setting the radio portable device having a two-way radio device of wireless communication system using DTMF control in self-diagnostic state, it features an effect of diagnosing without having influences on the system operation.

Also according to the invention, by key manipulation in the operation unit in the self-diagnostic state, the transmission and reception DTMF circuit and transmission and reception sound circuit can be diagnosed, and another effect is that the incoming radio wave state can be diagnosed by key manipulation of the operation unit.

DESCRIPTION OF THE PREFERRED EMBODIMENT

Described below is an embodiment of the invention applied in a radio portable device having a two-way radio device of wireless communication system using DTMF.

Figure 1:
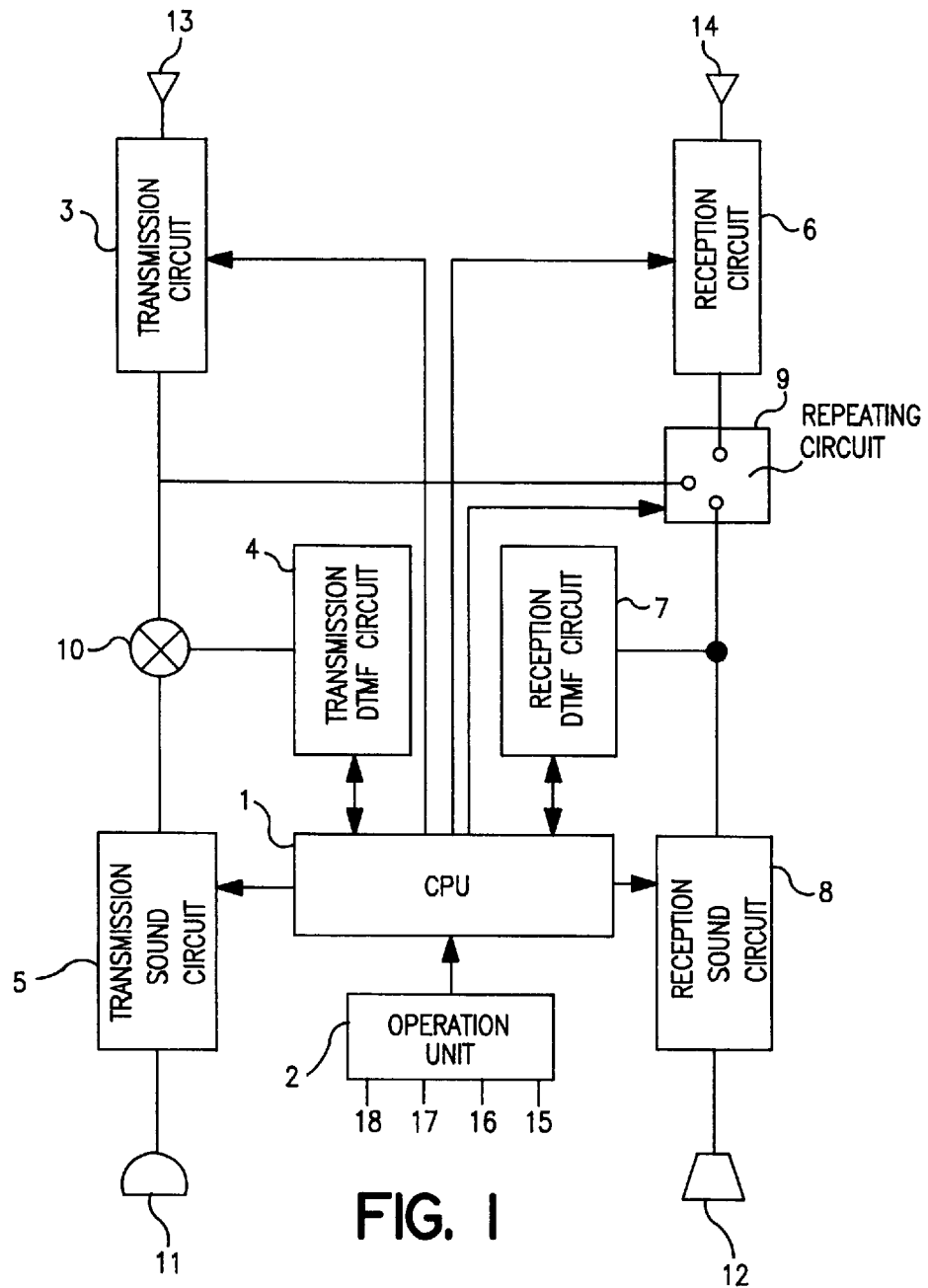
FIG. 1 is a block diagram showing a constitution of a radio portable device according to the invention.

FIG. 1 is a block diagram showing a constitution of a radio portable device having a two-way radio device. In FIG. 1, reference numeral 1 is a central processing unit (CPU) for controlling the entire radio portable device, an operation unit 2, a transmission DTMF circuit 4, a reception DTMF circuit 7, a transmission sound circuit 5, a reception sound circuit 8, and a repeating circuit 9 are connected to this CPU 1. In this embodiment, high tone (800 Hz to 2 kHz) and low tone (80 Hz to 200 Hz) are used as DTMF. That is, a high tone DTMF signal is used in the initial phase of communication start, and a low tone DTMF signal is used when starting speech.

The operation unit 2 comprises a power switch 15, a talk key 16, a page key 17, and an A/B lane changeover key 18. The talk key 16, page key 17, and A/B lane changeover key 18 are manipulated in the case of self-diagnosis. The transmission DTM circuit 4 receives transmission instruction, DTMF type data, and tone changeover instruction from the CPU 1, and transmits DTMF. The reception DTMF circuit 7 sends the presence or absence of DTMF reception, and type data of received DTMF to the CPU 1.

The transmission sound circuit 5 converts the sound input signal from a microphone 11 into an electric signal, and outputs to the transmission system radio circuit 3, and it also receives a mute instruction from the CPU 1. The reception sound circuit 8 converts the signal from the reception system radio circuit 6 into a sound signal, and outputs to a speaker 12, and it also receives a mute instruction from the CPU 1. The repeating circuit 9 changes over whether to take in the signal from the reception system radio circuit 6, or to repeat and receive the signal to be transmitted to the transmission system radio signal 3, and it also receives an instruction command from the CPU 1. The CPU 1 processes radio speech and processes self-diagnosis, and comprises a memory (not shown) for storing such program and data.

In thus constituted embodiment, the operation is described below by referring to FIG. 2 to FIG. 4.

Figure 2:
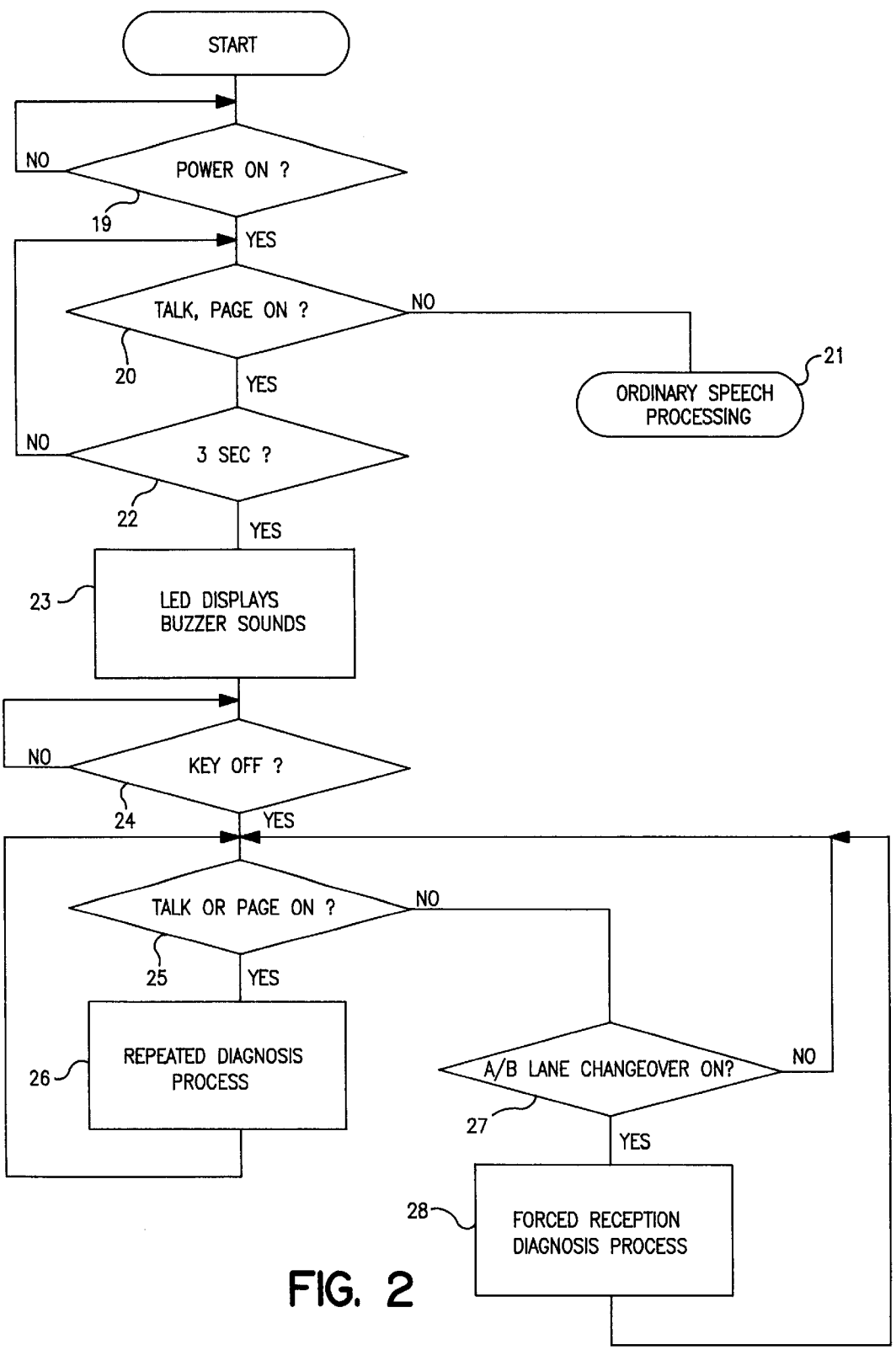
FIG. 2 is a flow chart showing the processing procedure of self-diagnosis in the invention.

FIG. 2 is a flow chart shoring the self-diagnostic procedure by the CPU.

At step 19, when it is judged that the power source is turned on by the ON manipulation of the power switch 15, it is judged whether the talk key 16 and page key 17 are pressed or not (step 20). As a result of judgement, if not pressed, self-diagnosis is not requested, and hence the usual speech process starts (step 21). When both talk key 16 and page key 17 are pressed, if it is judged that the both keys are pressed for a specific time, for example, 3 seconds required to judge that pressing of both keys is not a misoperation (step 22), self-diagnostic process starts.

Coming into the self-diagnostic process, the LED is lit and the buzzer sounds to tell the user that the self-diagnostic process has begun (step 23). This judgement continues until both talk key 16 and page key 17 pressed to get into the self-diagnostic process are turned off (step 24).

Next, after the talk key 16 and page key 17 are turned off, it is judged if the user has pressed either the talk key 16 or page key 17 in order to diagnose (step 25). When it is detected that either the talk key 16 or page key 17 is pressed, the CPU 1 closes the repeating route of the repeating circuit 9, and diagnoses the transmission DTMF circuit 4, reception DTMF circuit 7, transmission sound circuit 5, and reception sound circuit 8 (step 26).

If the talk key 16 or page key 17 has not been pressed, it is judged if the A/B lane changeover key 18 has been pressed or not (step 27). Herein, if it is detected that the A/B lane changeover key 18 has been pressed, the reception system radio circuit 6 is put in action by force to diagnose the incoming radio wave state (step 28).

The self-diagnostic process is stopped by turning off the power switch 15, and the OFF detection or processing of the power switch 15 is possible at any step.

Figure 3:
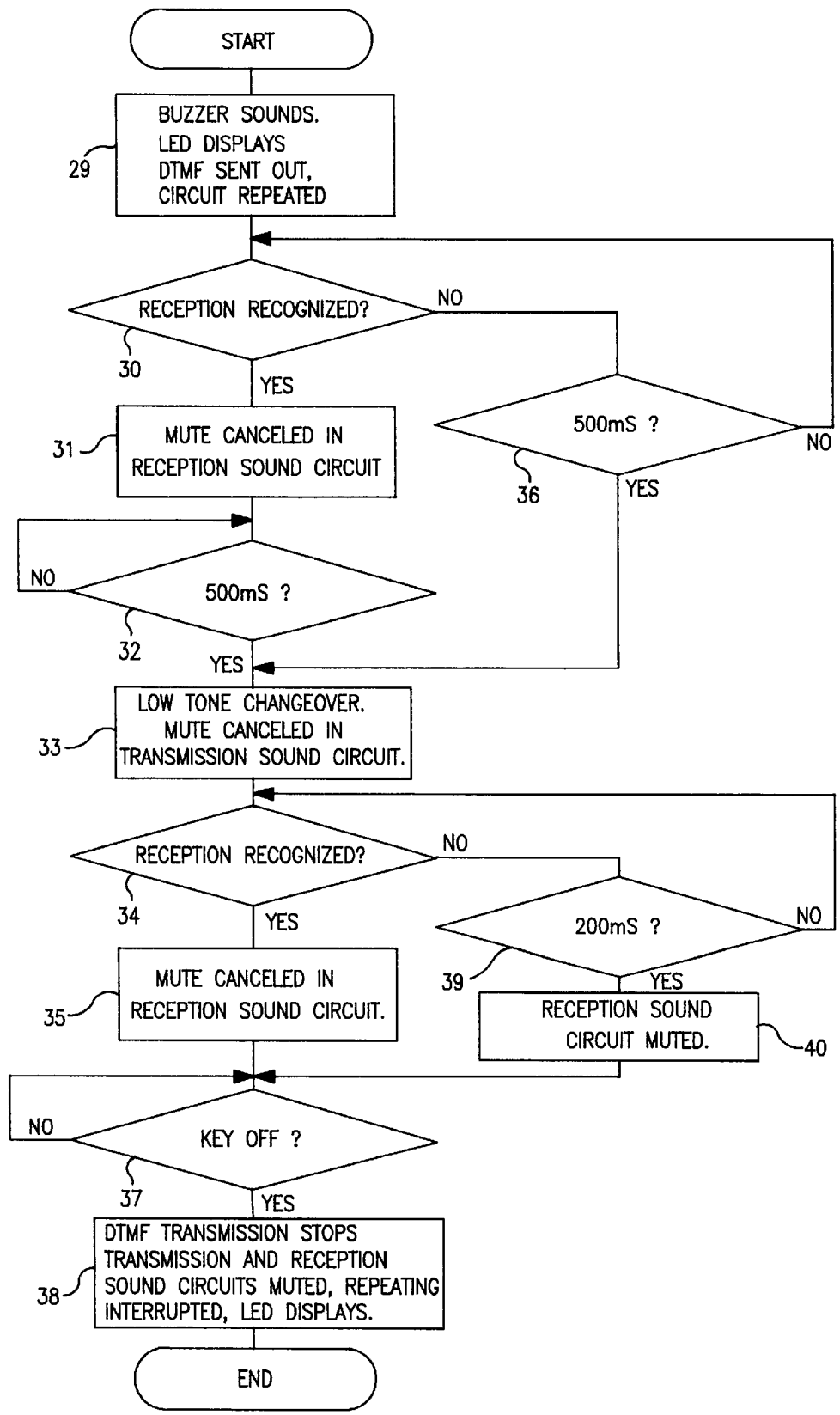
FIG. 3 is a flow chart showing the processing procedure of diagnosis of DTMF circuit and sound circuit in the invention.

FIG. 3 is a flow chart showing the detail of diagnostic procedure for diagnosing the DTMF circuit and sound circuit by creating a repeating route.

A buzzer sound corresponding to a key to confirm pressing of the talk key 16 or page key 17 is sent to the speaker 12, and the LED telling the process of diagnosis is lit up to tell the user that the diagnosis is in progress. Moreover, the DTMF high tone (800 Hz to 2 kHz) corresponding to the key is sent from the transmission DTMF circuit 4, and a direction command is issued from the CPU 1 to the repeating circuit 9, and therefore the transmission signal is repeatedly received in the reception sound circuit 8, and the time measurement starts by a first timer built in the CPU 1 (step 29). In the first timer, the time allowing the DTMF high tone to be heard sufficiently by the user, for example, 500 ms is preset.

In the reception DTMF circuit 7, it is judged if the reception tone has been recognized or not (step 30), and if recognized, the mute is canceled in the reception sound circuit 8 (step 31), thereby waiting until the first timer expires (step 32). At this time, a DTMF high tone can be heard from the speaker 12. At step 36, if the first timer expires without recognizing the reception tone, the operation goes to step 33 for controlling the DTMF low tone (80 Hz to 200 Hz).

At step 32, when the first timer expires, the transmission DTMF circuit 4 is instructed to change over from high tone to low tone, and the mute is canceled in the transmission sound circuit 5, and the time measurement is started by a second timer built in the CPU 1 (step 33). In the second timer, the time sufficient for the reception DTMF circuit 7 for recognizing the DTMF low tone, for example, 200 ms is preset.

In the reception DTMF circuit 7, it is judged if the reception tone has been recognized or not (step 34), and if recognized, the mute is canceled in the reception sound circuit 8 (step 35). At this time, the input sound from the microphone 11 can be heard from the speaker 12. If the second timer expires at step 39 without recognizing the reception tone at step 34, the reception sound circuit 8 is muted (step 40), thereby going to step 37 to judge if the talk key 16 or page key 17 is released.

At step 37, it is judged if the user has released the talk key 16 or page 17 or not to stop repeated diagnosis (step 37), and if detected to be released, transmission stop is instructed to the transmission DTMF circuit 4, and the transmission sound circuit 5 and reception sound circuit 8 are muted, and a direction command is issued to the repeating circuit 9 to interrupt the repeating route, thereby changing the LED display state to the initial state (step 38).

Figure 4:
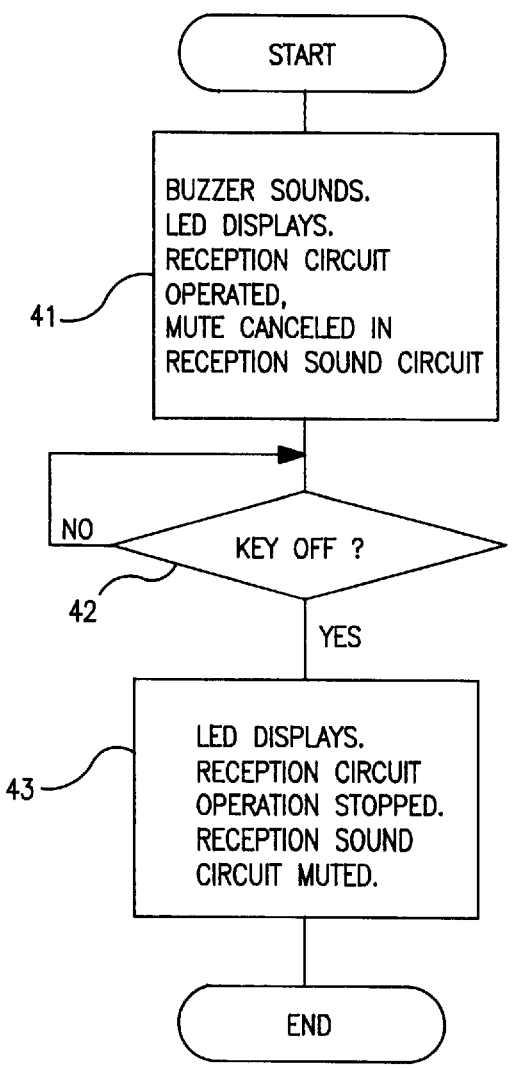
FIG. 4 is a flow chart showing the processing procedure of diagnosis of incoming radio wave of reception system radio circuit in the invention.

FIG. 4 is a flow chart showing the detail of diagnostic procedure for diagnosing incoming radio waves by actuating the reception system radio circuit 6 by force.

At step 41, a buzzer sound corresponding to the key to confirm pressing of the A/B lane changeover key 18 is sent to the speaker 12, and the LED is displayed to tell the user that the diagnosis is in progress. Furthermore, the reception system radio circuit 6 is operated by force, and the mute of the reception sound circuit 8 is canceled. At step 42, it is judged if the user has released the A/B lane changeover key 18 for stopping the reception state diagnosis. Herein, if release of the key is detected, the operation of the reception system radio circuit 6 is stopped, the LED display is changed to the initial state, and the reception sound circuit 8 is muted (step 43), and thereby diagnosis of incoming radio wave state is terminated.

Therefore, according to the embodiment, the radio portable device having the two-way radio device can be self-diagnosed repeatedly alone.

Thus, by the self-diagnostic method of radio portable device having two-way radio device using DTMF control of the invention, in the event of speech failure, the radio portable device can be self-diagnosed without shutting down the system.

Moreover, to see if the DTMF circuit used in communication control is working normally or not, or if the sound circuit is working normally or not, the user can diagnose by hearing from the speaker, and also by setting in the reception state by force, the incoming radio wave state can be further diagnosed.

What is claimed is:

1. A method for self-diagnosing a radio device having a reception radio circuit, a reception sound circuit, and an operation unit, said method comprising the steps of:

activating an input in the operation unit to operate the reception radio circuit for receiving an incoming signal, canceling a mute function of the reception sound circuit in order to hear a sound associated with the incoming signal, and diagnosing the condition of the incoming signal based on the sound associated with the incoming signal.

2. A method for self-diagnosing the radio device of claim 1, wherein a speaker is connected to the reception sound circuit, and sound therefrom is used to diagnose the incoming signal.

3. A method for self-diagnosing a two-way radio device having a reception radio circuit, a transmission DTMF circuit, a reception DTMF circuit, a transmission sound circuit, a reception sound circuit, an operation unit, a repeating circuit, a microphone, and a speaker, using a high DTMF tone ranging from about 800 Hz to about 2 KHz and a low DTMF tone ranging from about 80 Hz to about 200 Hz for communication control, said method comprising the steps of:

activating a first key in the operation unit to set the two-way portable radio device into a self-diagnostic state, diagnosing the transmission DTMF circuit and the transmission sound circuit by receiving the high DTMF tone from the transmission DTMF circuit and a signal from the transmission sound circuit through the repeating circuit in the reception DTMF circuit and reception sound circuit respectively upon activation of a second key in the operation unit, operating the reception radio circuit by activating a third key in the operation unit to receive an incoming signal, and diagnosing a condition of the incoming signal from the reception radio circuit by receiving the incoming signal with the reception sound circuit.

4. A method for self-diagnosing the two-way radio device of claim 3, wherein diagnosis is made by hearing at least one of the high tone of the transmission DTMF circuit and a microphone input of the transmission sound circuit through the speaker.

5. A method for self-diagnosing a two-way radio device having a transmitting DTMF circuit, a reception DTMF circuit, a transmission sound circuit, a reception sound circuit and a repeating circuit, and using DTMF for communication control, said method comprising the steps of:

manipulating a specific key to set the portable radio device into a self-diagnostic state, and receiving a transmission DTMF and a transmission sound signal through the repeating circuit and provided to the reception DTMF and the reception sound circuit, respectively, to diagnose each of i) the transmitting DTMF circuit, ii) the reception DTMF circuit, iii) the transmission sound circuit and iv) the reception sound circuit of the portable radio device.

6. A method for self-diagnosing a two-way radio device said method comprising the steps of:

determining if both a talk key and a page key are activated, determining if both the talk key and the page key are pressed continuously for a specific time, determining if one of the talk key and the page key is reactivated after both the talk key and the page key are deactivated, diagnosing i) the transmission DTMF circuit, ii) the reception DTMF circuit, iii) the transmission sound circuit and iv) the reception sound circuit by repeatedly receiving the signals from the transmission DTMF circuit and the transmission sound circuit in the reception DTMF circuit and the reception sound circuit when one of the talk key and the page key is activated, determining if an A/B lane changeover key is activated when at least one of the talk key and the page key is deactivated, and diagnosing a condition of an incoming signal by operating the reception radio circuit responsive to the activation of the A/B lane changeover key.

7. A radio device comprising:

a reception radio circuit, a transmission DTMF circuit, a reception DTMF circuit, a transmission sound circuit, a reception sound circuit, an operation unit, a repeating circuit, a microphone, and a speaker, wherein said operation unit includes a first key for setting the portable radio device into a self-diagnostic state, a second key for operating the reception radio circuit to diagnose a condition of an incoming signal, and means for i) repeating the signals from the transmission DTMF circuit and the transmission sound circuit into the reception DTMF circuit and the reception sound circuit through the repeating circuit when the first key is manipulated, and ii) operating the reception system radio circuit when the second key is activated.

8. A method for self-diagnosing a radio device having a transmission DTMF circuit, a repeating circuit, and a reception DTMF circuit, said method comprising the steps of:

generating DTMF tones in the transmission DTMF circuit, transmitting the DTMF tones to the reception DTMF circuit through the repeating circuit, recognizing the DTMF tones from the reception DTMF circuit, and diagnosing the radio device based on the recognized DTMF tones.

9. A method for self-diagnosing a radio device according to claim 8, wherein said radio device further comprises a transmission sound circuit and a reception sound circuit, and said method further comprising the steps of:

receiving a sound from the transmission sound circuit in the reception sound circuit through the repeating circuit in order to diagnose the radio device.

10. A method for self-diagnosing the radio device of claim 9, wherein a high DTMF tone ranging from about 800 Hz to about 2 KHz and a low DTMF tone ranging from about 80 Hz to about 200 Hz are generated by the transmission DTMF circuit and received by the reception DTMF circuit.

11. A method for self-diagnosing the radio device of claim 10, wherein said radio device further comprises an operation unit, a microphone connected to the transmission sound circuit and a speaker connected to the reception sound circuit, said method further comprising the steps of:

transmitting the high DTMF tone of the transmission DTMF circuit to the reception DTMF circuit through the repeating circuit responsive to activation of an input in the operation unit, diagnosing the transmission DTMF circuit and the reception DTMF circuit based on hearing the high tone DTMF from the speaker, transmitting i) the low DTMF tone of the transmission DTMF circuit and ii) the microphone input of the transmission sound circuit to the reception DTMF circuit and the reception sound circuit through the repeating circuit until the input in the operation unit is deactivated, and diagnosing the radio device based on hearing the microphone input of the transmission sound circuit from the speaker.

12. A self-diagnostic radio device comprising:

selection means for selecting one of a plurality of operation modes of said radio device, DTMF generating means for generating DTMF tones responsive to the selected mode, and control means for controlling said DTMF generating means, wherein activation of a first input to said selection means for a predetermined time selects a self-diagnostic mode of the plurality of operation modes of said radio device for diagnosing said radio device, and activation of a second input to said selection means after deactivation of the first input to said selection means selects another mode of the plurality of operation modes of the radio device for further diagnosing an incoming signal to said radio device.

13. A self-diagnostic radio device comprising:

transmission means, receiving means, audio input means coupled to said transmission means, audio output means coupled to said receiving means, DTMF generating means for generating and recognizing DTMF tones coupled to said transmission means and said receiving means, control means for controlling i) said transmission means, ii) said receiving means, iii) said audio input means and iv) said audio output means, and selection means for selecting one of a plurality of operation modes of said radio device, said selection means including at least a page key, a talk key and an a A/B changeover key, wherein activation of both the page key and the talk key for a predetermined time selects a self-diagnostic mode of the plurality of operation modes of said radio device for diagnosing i) said audio input means, ii) said audio output means and iii) said DTMF means, and activation of the A/B changeover key after deactivation of the page key and the talk key selects another mode of the plurality of operation modes of the radio device for further diagnosing an incoming signal received by said radio device.

14. A method for self-diagnosing a two-way radio device having a reception radio circuit, a transmission DTMF circuit, a reception DTMF circuit, a transmission sound circuit, a reception sound circuit, an operation unit, a repeating circuit, a microphone, and a speaker, using a high DTMF tone ranging from about 800 Hz to about 2 KHz and a low DTMF tone ranging from about 80 Hz to about 200 Hz for communication control, said method comprising the steps of:

activating a specific key in the operation unit to set the two-say portable radio device into a self-diagnostic state, transmitting the high DTMF tone responsive to the activated specific key in the operating unit, canceling a mute mode of the reception sound circuit when the high DTMF tone received through the repeating circuit is coincident with the transmitted high DTMF tone from the transmission DTMF circuit, diagnosing the transmission DTMF circuit and the reception DTMF circuit based on hearing an output sound of the reception sound circuit, transmitting the low DTMF tone a predetermined period after the high DTMF tone is transmitted, and canceling the mute mode of the transmission sound circuit, canceling the mute mode of the reception sound circuit when the low DTMF tone received through the repeating circuit is coincident with the transmitted low DTMF tone from the transmission DTMF circuit, transmitting a signal from the microphone to the reception sound circuit through the transmission sound circuit and the repeating circuit, and diagnosing the transmission sound circuit and the reception sound circuit based on hearing an output sound from the reception sound circuit.

* * * * *